(12) United States Patent
Kaidi

(10) Patent No.: US 11,922,375 B2
(45) Date of Patent: Mar. 5, 2024

(54) SECURITY DATA POINTS FROM AN ELECTRONIC MESSAGE

(71) Applicant: PayPal, Inc., San Jose, CA (US)

(72) Inventor: George Chen Kaidi, Singapore (SG)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/515,403

(22) Filed: Oct. 30, 2021

(65) Prior Publication Data

US 2022/0116344 A1 Apr. 14, 2022

Related U.S. Application Data

(63) Continuation of application No. 16/658,061, filed on Oct. 19, 2019, now Pat. No. 11,205,156.

(51) Int. Cl.
*G06Q 20/40* (2012.01)
*G06Q 10/107* (2023.01)
*G06Q 20/38* (2012.01)
*H04L 9/40* (2022.01)
*H04L 51/04* (2022.01)
(Continued)

(52) U.S. Cl.
CPC ......... *G06Q 10/107* (2013.01); *G06Q 20/382* (2013.01); *G06Q 20/40* (2013.01); *G06Q 20/405* (2013.01); *H04L 51/04* (2013.01); *H04L 51/212* (2022.05); *H04L 51/214* (2022.05); *H04L 51/48* (2022.05); *H04L 51/58* (2022.05); *H04L 63/08* (2013.01); *H04L 63/1408* (2013.01); *G06Q 20/4016* (2013.01)

(58) Field of Classification Search
CPC .. G06Q 20/405; G06Q 20/4016; H04L 51/04; H04L 51/212; H04L 51/214; H04L 51/48; H04L 51/58
See application file for complete search history.

(56) References Cited

U.S. PATENT DOCUMENTS

| 11,049,207 B1* | 6/2021 | Weldon | H04L 63/1441 |
| 2010/0100962 A1* | 4/2010 | Boren | H04L 63/1441 726/25 |

(Continued)

OTHER PUBLICATIONS

Webster., "Webster's New World Compact School and Office Dictionary," 1995, Simon and Schuster Macmillan Company, 3 pages.

*Primary Examiner* — Philip C Lee
(74) *Attorney, Agent, or Firm* — Greenberg Traurig, LLP

(57) ABSTRACT

Systems and techniques for providing security data points from an electronic message are presented. A system can determine a first interne protocol (IP) address of a computing device in response to a user of the computing device opening an email sent to an email address corresponding to a particular electronic account of the user, the email comprising an IP address tracking mechanism. The system can also compare the first IP address with one or more second IP addresses corresponding to one or more electronic accesses of the particular electronic account. Furthermore, the system can determine if an account access anomaly exists in regard to the particular electronic account based on a result of the comparing. The system can also implement a security measure impacting an ability of the particular electronic account to conduct one or more transactions in response to the account access anomaly existing for the particular electronic account.

18 Claims, 10 Drawing Sheets

(51) Int. Cl.
     *H04L 51/212*    (2022.01)
     *H04L 51/214*    (2022.01)
     *H04L 51/48*     (2022.01)
     *H04L 51/58*     (2022.01)

(56) References Cited

U.S. PATENT DOCUMENTS

| | | |
|---|---|---|
| 2015/0227989 A1 | 8/2015 | Chattopadhyay et al. |
| 2018/0075437 A1* | 3/2018 | Snyder ............... G06Q 20/3223 |
| 2018/0288066 A1 | 10/2018 | Brockhuus et al. |
| 2020/0082108 A1 | 3/2020 | Griffin |
| 2020/0175518 A1* | 6/2020 | Chu ................... G06Q 20/4016 |
| 2020/0279050 A1 | 9/2020 | Endler |

* cited by examiner

SECURITY DATA POINTS FROM AN ELECTRONIC MESSAGE

CROSS-REFERENCE TO RELATED APPLICATION

This application is a continuation of and claims priority to U.S. patent application Ser. No. 16/658,061, filed Oct. 19, 2019 and is incorporated herein by reference in its entirety.

TECHNICAL FIELD

This disclosure relates generally to transaction systems, and more specifically, to security associated with a transaction system.

BACKGROUND

Mitigation solutions to combat online threats to a transaction system often involve monitoring transactions. However, accurately detecting security threats to a transaction system by monitoring transactions is challenging in view of constantly evolving methodology on the part of bad actors. Applicant recognizes that online threats to a transaction system can reduce performance of the transaction system and cause unnecessary operations that might otherwise be avoided, and thus, it would be desirable to improve security associated with transaction systems.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
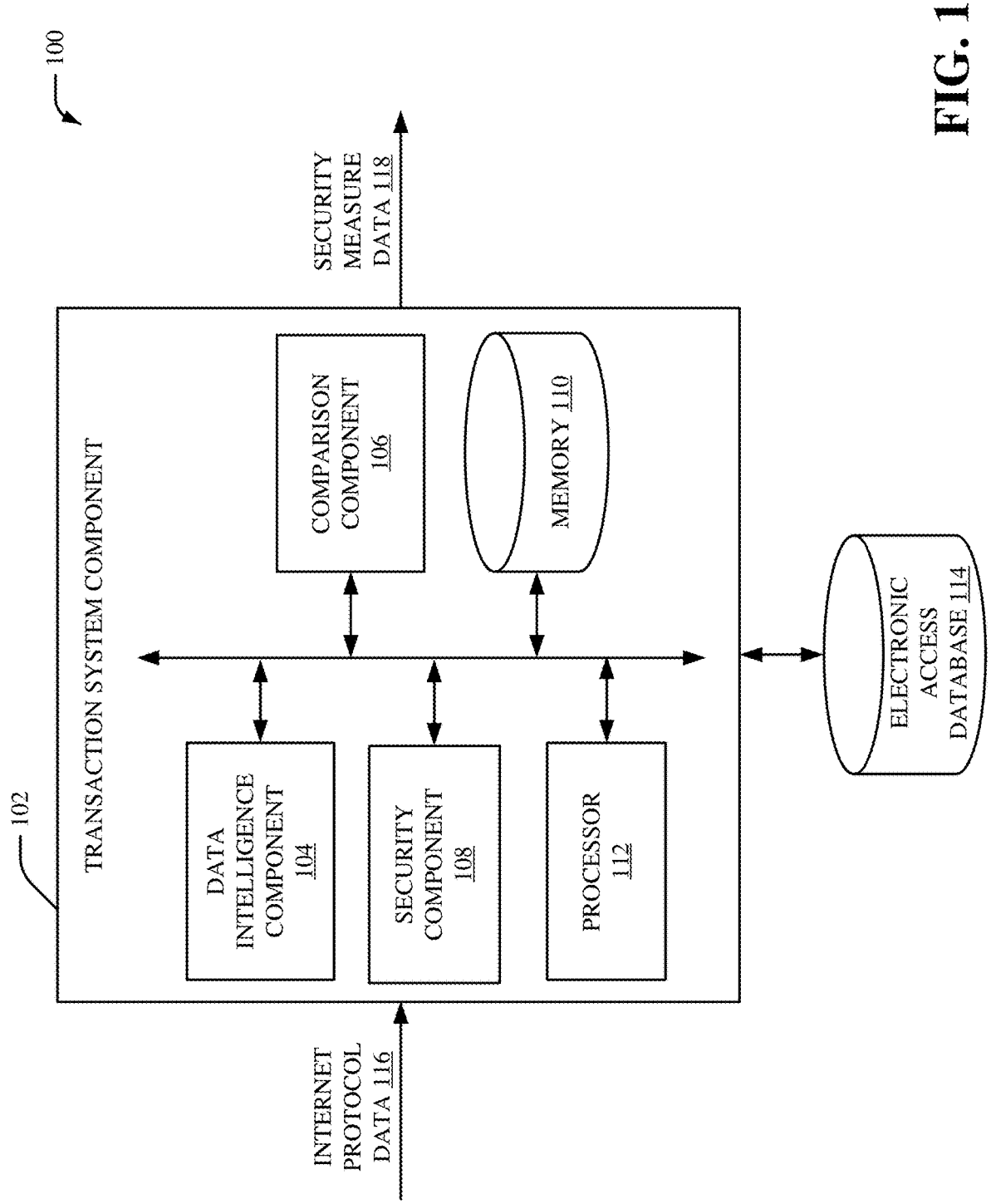
FIG. 1 illustrates a block diagram of an example, non-limiting system that includes a transaction system component in accordance with one or more embodiments described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without one or more of these specific details in various embodiments, or with other methods, components, materials, etc. not explicitly mentioned herein. In other instances, well-known structures and devices are shown in block diagram form to facilitate describing one or more aspects.

Systems that attempt to detect online security threats such as account takeover attempts, remote exploits, unauthorized use of an account (e.g. account fraud), etc. may collect and/or use certain data in order to make a determination as to whether a particular action or series of actions represents a security threat. A simple example could be someone submitting an incorrect password for an account 20 times within a five minute period. These actions might represent an account takeover attempt. Or if a particular device at a particular internet protocol (IP) address is used to login to 10 different user accounts also within a five minute period of time, that IP address could belong to a malicious actor (as a single device on a single IP address typically would not have such a login pattern).

A network IP address associated with account usage can be logged when that account is accessed (or access is attempted). For example, any time a user tries to login to an account via a web page or a mobile phone application, the IP address (and other information) associated with the accessing device can be logged. History can be retained on these IP addresses (and other information).

There is an opportunity to log additional information, however, related to user accounts. Emails are often sent to email addresses that are registered to a user account, and when those emails are accessed, an IP address and/or other device information can be captured. This can provide an additional stream of information that when used for security purposes, can allow for better detection of security threats to a transaction system. Specifically, detection mechanisms can be used to capture IP address and/or device information when an email is read or accessed, and this can be correlated with other logged information to reach a decision as to whether an action or series of actions represents a security threat.

Accordingly, systems and techniques for providing and/or employing security data points from an electronic message are presented. For instance, IP addresses can be captured from electronic messages to facilitate generation of security data points. These electronic messages can be emails sent to email addresses of corresponding electronic accounts of users, or other communications.

In an example, an email can be a confirmation and request email sent to an email address of a corresponding electronic account of a user, an order summary email sent to an email address of a corresponding electronic account of a user, a policy update email sent to an email address of a corresponding electronic account of a user, a news email sent to an email address of a corresponding electronic account of a user, another type of email, etc. In an embodiment, an IP address can be captured from an image and/or a logo included in an email using a tracking pixel in the image and/or the logo. For example, the tracking pixel can employ a unique link or a link with a unique uniform resource locator (URL) parameter. Furthermore, loading of the image and/or the logo via the email can simulate a click of the URL that can be registered as a hit on a server (e.g., a server of an online transaction system). In another embodiment, an IP address can be captured from an email using a hypertext link included in the email. For example, a click of the URL via the email can be registered as a hit on a server (e.g., a server of an online transaction system). In an aspect, an IP address captured from an electronic message (e.g., captured from an email) can be associated and/or compared with a corresponding electronic account of a user. In another aspect, a tracking pixel and/or a hypertext link included in an email can provide a callback transmission to a server that registers a corresponding IP address and/or a URL parameter that can associate the corresponding IP address with a corresponding electronic account of a user. As such, it can be determined whether a callback transmission is associated with a security threat (e.g., a cyber threat) by comparing an IP address captured from an electronic message (e.g., captured from an email) with one or more other IP addresses corresponding to one or more previous electronic accesses by an electronic account of a user. An account access anomaly may be indicative of such a security threat. Furthermore, in response to the IP address captured from the electronic message being different than the one or more other IP addresses, a distance between the IP address captured from the electronic message and the one or more other IP addresses can be determined to determine whether the callback transmission is associated with a security threat (e.g., a cyber threat). Accordingly, a security threat (e.g., a cyber threat) associated with a transaction system can be detected. An amount of time to detect a security threat (e.g., a cyber threat) associated with a transaction system can also be reduced. Furthermore, loss associated with a transaction system in response to a security threat (e.g., a cyber threat) can be mitigated. In addition, security associated with a transaction system can be improved. Moreover, reliability of execution of a transaction by a transaction system can be improved, performance of a transaction system can be improved, and/or a computing experience associated with a transaction system can be improved.

According to an embodiment, a system can include a memory and a processor. The processor can be configured to execute computer instructions stored in the memory that when executed cause the system to perform operations comprising determining a first IP address of a computing device in response to a user of the computing device opening an email sent to an email address corresponding to a particular electronic account of the user, the email comprising an IP address tracking mechanism. The operations can further comprise comparing the first IP address with one or more second IP addresses corresponding to one or more electronic accesses of the particular electronic account. Furthermore, the operations can further comprise, based on a result of the comparing, determining if an account access anomaly exists in regard to the particular electronic account. The operations can further comprise in response to the account access anomaly existing for the particular electronic account, implementing a security measure impacting an ability of the particular electronic account to conduct one or more transactions.

In another embodiment, a computer-implemented method can provide for determining, by a system having a processor and a memory, a first IP address of a computing device in response to an electronic message associated with a particular electronic account of a user being opened by the computing device, the electronic message comprising an IP address tracking mechanism. The computer-implemented method can provide for determining, by the system, whether an account access anomaly exists with respect to the particular electronic account by comparing the first IP address with one or more second IP addresses corresponding to one or more electronic accesses of the particular electronic account. Furthermore, the computer-implemented method can provide for, in response to determining that the account access anomaly exists with respect to the particular electronic account, initiating, by the system, a security measure impacting an ability of the particular electronic account to conduct one or more transactions.

In yet another embodiment, a non-transitory computer readable storage medium can comprise instructions that, in response to execution, cause a system including a processor and a memory to perform operations, comprising: determining a first IP address of a computing device based on an IP tracking mechanism included in an email sent to an email address corresponding to a particular electronic account of a user, comparing the first IP address with one or more second IP addresses corresponding to one or more previous electronic accesses of the particular electronic account to determine whether an access anomaly exists with respect to the particular electronic account, and implementing a security measure impacting an ability of the particular electronic account to conduct one or more transactions in response to the account access anomaly existing with respect to the particular electronic account.

Referring initially to FIG. 1, there is illustrated an example system 100 that provides for and/or employs security data points from an electronic message, in accordance with one or more embodiments described herein. The system 100 can be implemented on or in connection with a network of servers associated with an enterprise application. In one example, the system 100 can be associated with a cloud-based platform. In an embodiment, the system 100 can be associated with a computing environment that comprises one or more servers and/or one or more software components that operate to perform one or more processes, one or more functions and/or one or more methodologies in accordance with the described embodiments. A sever as disclosed herein can include, for example, stand-alone server and/or an enterprise-class server operating a server operating system (OS) such as a MICROSOFT® OS, a UNIX® OS, a LINUX® OS, and/or another suitable server-based OS. It is to be appreciated that one or more operations performed by a server and/or one or more services provided by a server can be combined, distributed, and/or separated for a given implementation. Furthermore, one or more servers can be operated and/or maintained by a corresponding entity or different entities.

The system 100 can be employed by various systems, such as, but not limited to fraud prevention systems, risk management systems, transaction systems, payment systems, online transaction systems, online payment systems, server systems, electronic device systems, mobile device systems, smartphone systems, virtual machine systems, consumer service systems, security systems, mobile application systems, financial systems, digital systems, machine learning systems, artificial intelligence systems, neural network systems, network systems, computer network systems, communication systems, enterprise systems, time-management systems, scheduling systems, electronic calendaring systems, asset management systems, work and productivity systems, email systems, electronic message systems, messaging systems, cloud storage systems, social networking systems, note-taking systems, word processor systems, spreadsheet systems, presentation program systems, and the like (note that the terms used above as examples are not mutually exclusive; a "transaction system" does not imply that system cannot also include or be a payment system, server system, etc.). In one example, the system 100 can be associated with a Platform-as-a-Service (PaaS). Moreover, the system 100 and/or the components of the system 100 can be employed to use hardware and/or software to solve problems that are highly technical in nature (e.g., related to security for a computing system, related to fraud mitigation for a computing system, related to cyber threat mitigation for a computing system, related to digital data processing, etc.), that are not abstract and that cannot be performed as a set of mental acts by a human.

The system 100 includes a transaction system component 102. In FIG. 1, the transaction system component 102 can include a data intelligence component 104, a comparison component 106, and/or a security component 108. Note that in various embodiments, the data intelligence component 104, the comparison component 106, and/or the security component 108 can be implemented as stored software instructions that are executable by a processor to cause particular operations to occur. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. The system 100 (e.g., the transaction system component 102) can include memory 110 for storing computer executable components and instructions. The system 100 (e.g., the transaction system component 102) can further include a processor 112 to facilitate operation of the instructions (e.g., computer executable components and instructions) by the system 100 (e.g., the transaction system component 102). In certain embodiments, the system 100 can also include an electronic access database 114. For instance, in certain embodiments, the transaction system component 102 (e.g., the data intelligence component 104, the comparison component 106, and/or the security component 108) can be in communication with the electronic access database 114.

The transaction system component 102 (e.g., the data intelligence component 104) can receive internet protocol data 116. The internet protocol data 116 can be an IP address of a computing device associated with an electronic message. For example, the computing device can be a device that opens the electronic message and/or renders the electronic message on a display of the computing device. The electronic message can be, for example, an email (e.g., an email message). Furthermore, the computing device can be an electronic device, a client device, a mobile device, a smart device (e.g. an Internet-of-Things devices such as a smart television, etc.), a smart phone, a tablet device, a handheld device, a portable computing device, a wearable device, a computer, a desktop computer, a laptop computer, a point of sale (POS) device, and/or another type of electronic device associated with a display (i.e., the computing device can be more than one of the type of devices listed above, which are non-exclusive categories in various embodiments).

In an embodiment, the data intelligence component 104 can receive and/or determine the internet protocol data 116 in response to the electronic message being opened by the computing device. For instance, the data intelligence component 104 can receive and/or determine the internet protocol data 116 in response to the electronic message being rendered via a display of the computing device. In certain embodiments, the data intelligence component 104 can receive and/or determine the internet protocol data 116 in response to a user (e.g., a user identity) of the computing device opening an email sent to an email address corresponding to a particular electronic account of the user. In a non-limiting example, an email can be a confirmation and request email sent to an email address of a corresponding electronic account of a user, an order summary email sent to an email address of a corresponding electronic account of a user, a policy update email sent to an email address of a corresponding electronic account of a user, a news email sent to an email address of a corresponding electronic account of a user, another type of email, etc.

In an aspect, the electronic message (e.g., the email) can include an IP address tracking mechanism to facilitate generation of the internet protocol data 116. For instance, in an embodiment, the internet protocol data 116 can be captured from media content (e.g., an image, a logo, etc.) included in the electronic message (e.g., the email) using a tracking pixel in the media content (e.g., the image, the logo, etc.). For example, the tracking pixel can employ a unique link or a link with a unique URL parameter. Furthermore, loading of the media content via the electronic message can simulate a click of the URL that can be registered as a hit on a server (e.g., a server of an online transaction system). In another embodiment, the internet protocol data 116 can be captured from the electronic message (e.g., the email) using a hypertext link included in the electronic message (e.g., the email). For example, a click of the URL via the electronic message can be registered as a hit on a server (e.g., a server of an online transaction system). In an aspect, the IP address tracking mechanism in the electronic message (e.g., the email) can provide a callback transmission that includes the internet protocol data 116. For instance, the tracking pixel and/or the hypertext link included in the electronic message (e.g., the email) can provide a callback transmission that includes the internet protocol data 116. In certain embodiments, the callback transmission (e.g., the internet protocol data 116 associated with the callback transmission) can additionally include a URL parameter that can associate the IP address in the internet protocol data 116 with a corresponding electronic account of a user. A callback transmission may refer, for example, to a transmission sent from a device of a user accessing an email communication to a system associated with the transaction component 102 (e.g. an entity that controls the transaction component 102 can receive the callback transmission).

The comparison component 106 can compare the internet protocol data 116 with data stored in the electronic access database 114. For example, the comparison component 106 can compare an IP address included in the internet protocol data 116 with one or more IP addresses included in the electronic access database 114. The one or more IP addresses compared to the internet protocol data 116 can be a portion of IP addresses in the electronic access database 114 that corresponds to one or more electronic accesses of the particular electronic account associated with the electronic message (e.g., the email). An electronic access from the one or more electronic accesses associated with the electronic access database 114 can include, for example, a login attempt to an online transaction system by the particular electronic account, one or more previous transactions associated with the particular electronic account, one or more web request sessions associated with the particular electronic account, and/or another type of electronic access associated with the particular electronic account. For instance, in an embodiment, at least one IP address from the one or more IP addresses can correspond to a web request session related to the particular electronic account associated with the electronic message (e.g., the email). The web request session can include, for example, establishing a connection with a transaction system (e.g., an online transaction system), sending one or more requests to the transaction system (e.g., an online transaction system) for web session content, and/or receiving web session content from the transaction system (e.g., an online transaction system).

In certain embodiments, the web session content can be related to one or more transactions. A transaction can be an electronic exchange executed by a computing device. Furthermore, a transaction can be associated with one or more events (e.g., one or more transaction events) associated with a computing device. In an aspect, an event associated with a transaction can include a numerical value corresponding to an amount for a transaction. Additionally or alternatively, an event associated with a transaction can include time data related to a timestamp for the transaction. An event associated with a transaction can additionally or alternatively include an item associated with the transaction and/or an identifier for one or more entities associated with the transaction. In certain embodiments, a transaction can include a set of transaction requests for an online transaction system. In certain embodiments, a transaction can be a financial transaction. For example, a transaction can be data to facilitate a transfer of funds for transactions between two entities. In another embodiment, at least one IP address from the one or more IP addresses can be related to a transaction for the particular electronic account associated with the electronic message (e.g., the email). For instance, at least one IP address from the one or more IP addresses can be obtained from a log file (e.g., a server log) related to a transaction for the particular electronic account associated with the electronic message (e.g., the email).

In response to a determination that the internet protocol data 116 (e.g., the IP address included in the internet protocol data 116) matches one or more IP addresses included in the electronic access database 114, the comparison component 106 can determine that the internet protocol data 116 is not associated with a security threat (e.g., a cyber threat). For instance, in response to a determination that the internet protocol data 116 (e.g., the IP address included in the internet protocol data 116) matches one or more IP addresses included in the electronic access database 114, the comparison component 106 can determine that an account access anomaly does not exist with regard to the internet protocol data 116 and/or the particular electronic account. Furthermore, in response to a determination that the internet protocol data 116 (e.g., the IP address included in the internet protocol data 116) matches one or more IP addresses included in the electronic access database 114, the security component 108 can allow one or more transactions to be conducted using the IP address included in the internet protocol data 116. However, in response to a determination that the internet protocol data 116 (e.g., the IP address included in the internet protocol data 116) does not match an IP address from the one or more IP addresses included in the electronic access database 114, the comparison component 106 can determine that the internet protocol data 116 is associated with a security threat (e.g., a cyber threat).

For instance, in response to a determination that the internet protocol data 116 (e.g., the IP address included in the internet protocol data 116) does not match one or more IP addresses included in the electronic access database 114, the comparison component 106 can determine that an account access anomaly exists with regard to the internet protocol data 116 and/or the particular electronic account. In certain embodiments, in response to a determination that the internet protocol data 116 (e.g., the IP address included in the internet protocol data 116) does not match an IP address from the one or more IP addresses included in the electronic access database 114, the comparison component 106 can determine a distance between the internet protocol data 116 (e.g., the IP address included in the internet protocol data 116) and the one or more IP addresses included in the electronic access database 114. For example, the comparison component 106 can determine a distance between the internet protocol data 116 (e.g., the IP address included in the internet protocol data 116) and the one or more IP addresses included in the electronic access database 114 to verify whether an account access anomaly exists with regard to the internet protocol data 116 and/or the particular electronic account.

In certain embodiments, the comparison component 106 can perform learning with respect to the internet protocol data 116 and/or one or more IP addresses included in the electronic access database 114 to facilitate determining whether the internet protocol data 116 is associated with a security threat (e.g., a cyber threat). The comparison component 106 can also generate inferences with respect to the internet protocol data 116 and/or one or more IP addresses included in the electronic access database 114. The comparison component 106 can, for example, employ principles of artificial intelligence to facilitate learning with respect to the internet protocol data 116 and/or one or more IP addresses included in the electronic access database 114. The comparison component 106 can perform learning with respect to the internet protocol data 116 and/or one or more IP addresses included in the electronic access database 114 explicitly or implicitly. Additionally or alternatively, the comparison component 106 can also employ an automatic classification system and/or an automatic classification process to facilitate learning and/or generating inferences with respect to the internet protocol data 116 and/or one or more IP addresses included in the electronic access database 114. For example, the comparison component 106 can employ a probabilistic and/or statistical-based analysis (e.g., factoring into the analysis utilities and costs) to learn and/or generate inferences with respect to the internet protocol data 116 and/or one or more IP addresses included in the electronic access database 114. The comparison component 106 can employ, for example, a support vector machine (SVM) classifier to learn and/or generate inferences with respect to the internet protocol data 116 and/or one or more IP addresses included in the electronic access database 114. Additionally or alternatively, the comparison component 106 can employ other classification techniques associated with Bayesian networks, decision trees and/or probabilistic classification models. Classifiers employed by the comparison component 106 can be explicitly trained (e.g., via a generic training data) as well as implicitly trained (e.g., via observing user behavior, receiving extrinsic information). For example, with respect to SVM's that are well understood, SVM's are configured via a learning phase or training phase within a classifier constructor and feature selection module. A classifier is a function that maps an input attribute vector, x=(x1, x2, x3, x4, xn), to a confidence that the input belongs to a class—that is, f(x)=confidence(class).

In an aspect, the comparison component 106 can include an inference component that can further enhance automated aspects of the comparison component 106 utilizing in part inference-based schemes with respect to the internet protocol data 116 and/or one or more IP addresses included in the electronic access database 114. The comparison component 106 can employ any suitable machine-learning based techniques, statistical-based techniques and/or probabilistic-based techniques. For example, the comparison component 106 can employ expert systems, fuzzy logic, SVMs, Hidden Markov Models (HMIs), greedy search algorithms, rule-based systems, Bayesian models (e.g., Bayesian networks), neural networks, other non-linear training techniques, data fusion, utility-based analytical systems, systems employing Bayesian models, etc. In another aspect, the comparison component 106 can perform a set of machine learning computations associated with the internet protocol data 116 and/or one or more IP addresses included in the electronic access database 114. For example, the comparison component 106 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, and/or a set of different machine learning computations.

Furthermore, in response to a determination that the internet protocol data 116 is associated with a security threat (e.g., a cyber threat), the security component 108 can implement a security measure impacting an ability of the particular electronic account to conduct one or more transactions. For instance, in response to a determination that an account access anomaly exists with regard to the internet protocol data 116 and/or the particular electronic account, the security component 108 can implement a security measure impacting an ability of the particular electronic account to conduct one or more transactions. In an aspect, the security component 108 can generate security measure data 118 related to the security measure impacting an ability of the particular electronic account to conduct one or more transactions. For example, the security measure data 118 can include data related to one or more settings, one or more actions, one or more tasks, one or more processes, one or more requests, and/or one or more transmissions to facilitate execution of a security measure impacting an ability of the particular electronic account to conduct one or more transactions. The security component 108 can generate the security measure data 118, for example, in response to a determination that the internet protocol data 116 is associated with a security threat (e.g., in response to a determination that an account access anomaly exists with regard to the internet protocol data 116 and/or the particular electronic account). In certain embodiments, the security component 108 can transmit at least a portion of the security measure data 118 to one or more processors and/or one or more software components of one or more servers associated with an online transaction system. Additionally or alternatively, the security component 108 can transmit at least a portion of the security measure data 118 to one or more computing devices in communication with an online transaction system.

In an embodiment, the security measure can be associated with a fraud mitigation process for an online transaction system. For instance, in response to a determination that an account access anomaly exists with regard to the internet protocol data 116 and/or the particular electronic account, the security component 108 can perform a fraud mitigation process associated with the one or more transactions conducted by the particular electronic account. The fraud mitigation process can include, for example, setting one or more limits for the particular electronic account and/or one or more other electronic accounts, altering a risk level associated with the particular electronic account, altering a fraud risk model for one or more future transactions by the particular electronic account and/or one or more other electronic accounts, transmitting a step-up authentication request to the computing device associated with the internet protocol data 116, generating a digital security code to verify one or more transactions conducted by the particular electronic account, performing one or more tasks to mitigate an effect of the security threat (e.g., the cyber threat) on an online transaction system, restricting access of the particular electronic account to an online transaction system, performing one or more actions to modify one or more portions of an online transaction system, performing score cutoff thresholds considering different criteria for the online transaction system, and/or performing another type of fraud mitigation process associated with an online transaction system. In an embodiment, the security measure data 118 can include data to facilitate the fraud mitigation process for the online transaction system. For example, in certain embodiments, the security measure data 118 can include one or more limits for an electronic account, a new risk level for an electronic account, one or more new variable values for a fraud risk model, data associated with a step-up authentication request for a computing device, a digital security code, one or more score cutoff thresholds, and/or other data to facilitate the fraud mitigation process for the online transaction system.

Compared to a conventional system, the transaction system component 102 can provide improved security for an online transaction system and/or one or more transactions associated with an online transaction system. For instance, by employing the transaction system component 102, security threats associated with an online transaction system and/or one or more transactions associated with an online transaction system can be reduced. In addition, by employing the transaction system component 102, reliability of execution of a transaction by an online transaction system can be improved, performance of an online transaction system can be improved, and/or a computing experience with respect to an online transaction system can be improved. Moreover, it is to be appreciated that technical features of the transaction system component 102 are highly technical in nature and not abstract ideas. Processing threads of the transaction system component 102 that process the internet protocol data 116 cannot be performed by a human (e.g., are greater than the capability of a single human mind). For example, the amount of data to compare the internet protocol data 116, the speed of processing of the internet protocol data 116 and/or the data types of the internet protocol data 116 analyzed by the transaction system component 102 over a certain period of time can be respectively greater, faster and different than the amount, speed and data type that can be processed by a single human mind over the same period of time. Furthermore, a portion of the internet protocol data 116 and/or data associated with the electronic access database 114 analyzed by the transaction system component 102 can be encoded data and/or compressed data associated with one or more computing devices. Moreover, the transaction system component 102 can be fully operational towards performing one or more other functions (e.g., fully powered on, fully executed, etc.) while also analyzing the internet protocol data 116 and/or data associated with the electronic access database 114.

While FIG. 1 depicts separate components in the transaction system component 102, it is to be appreciated that two or more components may be implemented in a common component. Further, it can be appreciated that the design of system 100 and/or the transaction system component 102 can include other component selections, component placements, etc., to facilitate security data points from an electronic message.

Figure 2:
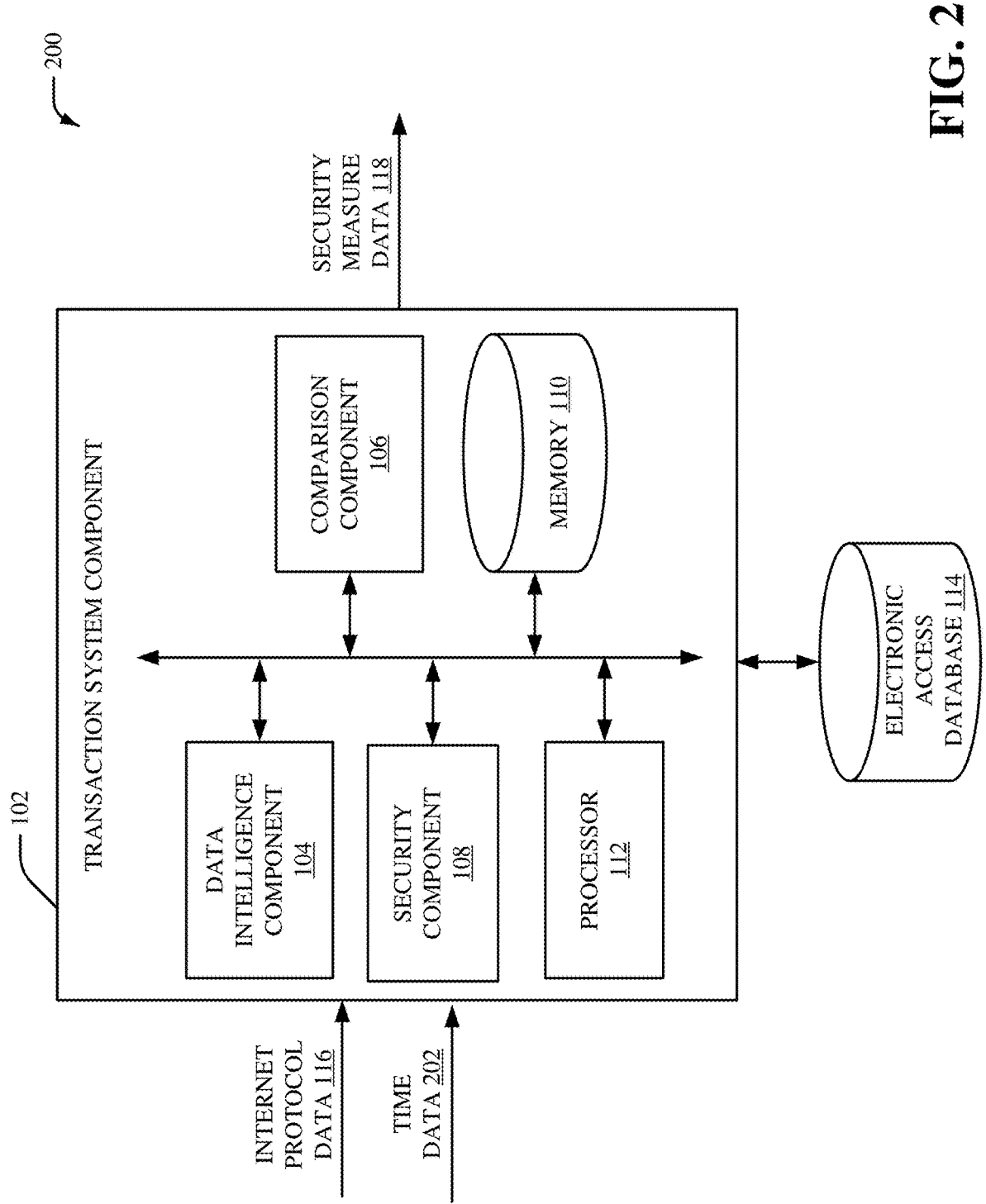
FIG. 2 illustrates a block diagram of another example, non-limiting system that includes a transaction system component in accordance with one or more embodiments described herein.

FIG. 2 illustrates an example, non-limiting system 200 in accordance with one or more embodiments described herein. Repetitive description of like elements employed in other embodiments described herein is omitted for sake of brevity. The system 200 includes the transaction system component 102. In FIG. 2, the transaction system component 102 can include the data intelligence component 104, the comparison component 106, the security component 108, the memory 110, and/or the processor 112. The transaction system component 102 (e.g., the data intelligence component 104) can receive the internet protocol data 116. Furthermore, in an embodiment, the transaction system component 102 (e.g., the data intelligence component 104) can receive time data 202. The transaction system component 102 (e.g., the security component 108) can also generate the security measure data 118.

The time data 202 can include, for example, an access time associated with the electronic message opened by the computing device. For example, the time data 202 can include an access time associated with the email opened by the computing device. In an embodiment, the time data 202 can include an access time associated with a rendering of the electronic message via a display of the computing device. For instance, the time data 202 can include an access time associated with a rendering of data associated with the email via a display of the computing device. In an embodiment, the comparison component 106 can additionally employ the time data 202 to determine whether the internet protocol data 116 is associated with a security threat (e.g., a cyber threat). For instance, the comparison component 106 can additionally employ the time data 202 to determine whether an account access anomaly exists with regard to the internet protocol data 116 and/or the particular electronic account. In certain embodiments, the comparison component 106 can additionally employ web browser data associated with the computing device, user agent data associated with the computing device, operating system data associated with the computing device, device data associated with the computing device, and/or other data to determine whether the internet protocol data 116 is associated with a security threat (e.g., a cyber threat). The web browser data can be related to a web browser employed by the computing device to access the electronic message, for example. The user agent data can be related to a software application (e.g., an email reader program) employed by the computing device to access the electronic message, for example. The operating system data can be related to information regarding an operating system employed by the computing device. The device data can be related to information regarding the computing device such as a type of the computing device, hardware information associated with the computing device, software information associated with the computing device, and/or other information associated with the computing device.

In an aspect, the comparison component 106 can compare the time data 202 to a time associated with transmission of the email to the email address the particular electronic account to determine whether the internet protocol data 116 is associated with a security threat (e.g., a cyber threat). For instance, the comparison component 106 can compare an interval of time between the time data 202 and a time associated with transmission of the email to the email address the particular electronic account to determine whether the internet protocol data 116 is associated with a security threat (e.g., a cyber threat). In another aspect, the comparison component 106 can compare the time data 202 to other time data related to one or more electronic accesses associated with the electronic access database 114 to determine whether the internet protocol data 116 is associated with a security threat (e.g., a cyber threat). For instance, the comparison component 106 can determine one or more correlations between the time data 202 and other time data related to one or more electronic accesses associated with the electronic access database 114 to determine whether the internet protocol data 116 is associated with a security threat (e.g., a cyber threat).

Figure 3:
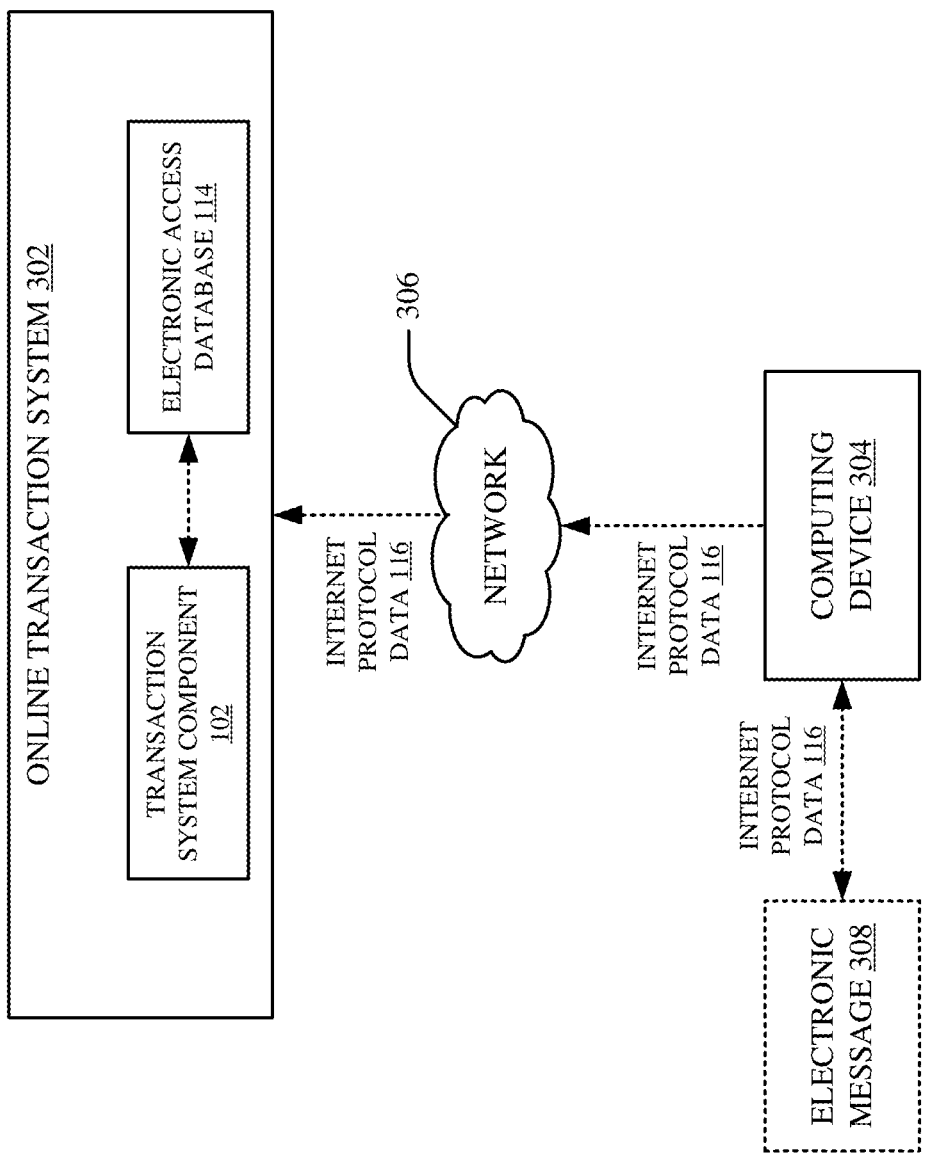
FIG. 3 illustrates an example, non-limiting system for providing security data points from an electronic message in accordance with one or more embodiments described herein.

FIG. 3 illustrates an example, non-limiting system 300 in accordance with one or more embodiments described herein. Repetitive description of like elements employed in other embodiments described herein is omitted for sake of brevity. The system 300 includes an online transaction system 302 and a computing device 304. The online transaction system 302 can be, for example, a server. Furthermore, the online transaction system 302 can include the transaction system component 102 and/or the electronic access database 114. In an aspect, the computing device 304 can be associated with an electronic message 308. In some embodiments of FIG. 3, the electronic message 308 can be employed to facilitate determining whether a security threat (e.g., the cyber threat) exists with respect to the online transaction system 302.

The online transaction system 302 and the computing device 304 can be in communication via a network 306. The network 306 can be a communication network, a wireless network, an IP network, a voice over IP network, an internet telephony network, a mobile telecommunications network, a landline telephone network, a personal area network, a wired network, and/or another type of network. The online transaction system 302 can be, for example, a stand-alone server and/or an enterprise-class server operating a server OS such as a MICROSOFT® OS, a UNIX® OS, a LINUX® OS, and/or another suitable server-based OS. It is to be appreciated that one or more operations performed by the online transaction system and/or one or more services provided by the online transaction system can be combined, distributed, and/or separated for a given implementation. Furthermore, the online transaction system can be associated with a payment system, an online payment system, an enterprise system, and/or another type of system.

The computing device 304 can be, for example, an electronic device, a client device, a mobile device, a smart device (e.g. an Internet-of-Things devices such as a smart television, etc.), a smart phone, a tablet device, a handheld device, a portable computing device, a wearable device, a computer, a desktop computer, a laptop computer, a POS device, and/or another type of electronic device associated with a display (i.e., the computing device 304 can be more than one of the type of devices listed above, which are non-exclusive categories in various embodiments). Furthermore, the computing device 304 can include one or more computing capabilities and/or one or more communication capabilities. In an aspect, the computing device 304 can provide one or more electronic device programs, such as system programs and application programs to perform various computing and/or communications operations. One or more of the electronic device programs associated with the computing device 304 can display a graphical user interface to present information to and/or receive information from one or more users of the computing device 304. In some embodiments, the electronic device programs associated with the computing device 304 can include one or more applications configured to execute and/or conduct one or more transaction. In an embodiment, an application program associated with the computing device 304 can be related to the online transaction system 302.

In an embodiment, the computing device 304 can be associated with an electronic message 308. The electronic message 308 can be, for example, an electronic message opened by the computing device 304. In an embodiment, the electronic message can be an email. For instance, the electronic message 308 can be an email (e.g., an email message) sent to an email address corresponding to the particular electronic account. However, it is to be appreciated that, in certain embodiments, the electronic message 308 can be a different type of electronic message such as a text message, an application notification, a computing device notification, a personal message, an instant message, a fax message, a voice message and/or another type of electronic message. In another embodiment, the electronic message 308 can be rendered via a display of the computing device 304. For instance, data associated with the electronic message 308 can be rendered as one or more visual elements via a display of the computing device 304. In another embodiment, the online transaction system 302 that includes the transaction system component 102 can receive the internet protocol data 116 via the network 306.

In an aspect, the internet protocol data 116 can be associated with the electronic message 308. For example, the online transaction system 302 that includes the transaction system component 102 can receive the internet protocol data 116 from the computing device 304 and/or a log file (e.g., a server log) associated with the electronic message 308. In certain embodiments, the internet protocol data 116 can be generated in response to the electronic message 308 being opened and/or rendered by the computing device 304. In an embodiment, the internet protocol data 116 can be captured from an image and/or a logo included in the electronic message 308 using a tracking pixel in the image and/or the logo. In another embodiment, the internet protocol data 116 can be captured from the electronic message 308 using a hypertext link included in the email. For example, the internet protocol data 116 can be captured from the electronic message 308 in response to accessing a hypertext link included in the email. The computing device 304 can provide at least a portion of the internet protocol data 116. Furthermore, the computing device 304 can be a source of a potential security threat (e.g., a cyber threat). For example, in an embodiment, the computing device 304 can provide undesirable behavior associated with the online transaction system 302. In another embodiment, the transaction system component 102 of the online transaction system 302 can monitor the internet protocol data 116 for a security threat (e.g., a cyber threat) and can initiate a security measure to mitigate a security threat (e.g., a cyber threat) associated with the online transaction system 302, as more fully disclosed herein. As such, with the system 300, detection of a security threat (e.g., a cyber threat) associated with the online transaction system 302, the computing device 304 and/or an electronic account associated with the online transaction system 302 can be improved. Additionally, by employing the system 300, a security threat (e.g., a cyber threat) associated with the online transaction system 302 can be mitigated, security associated with the online transaction system 302 can be improved, reliability of execution of a transaction by the online transaction system 302 can be improved, performance of the online transaction system 302 can be improved, and/or a computing experience associated with the online transaction system 302 can be improved. Additionally, with the system 300, reliability of execution of a transaction by the online transaction system 302 can be improved.

Figure 4:
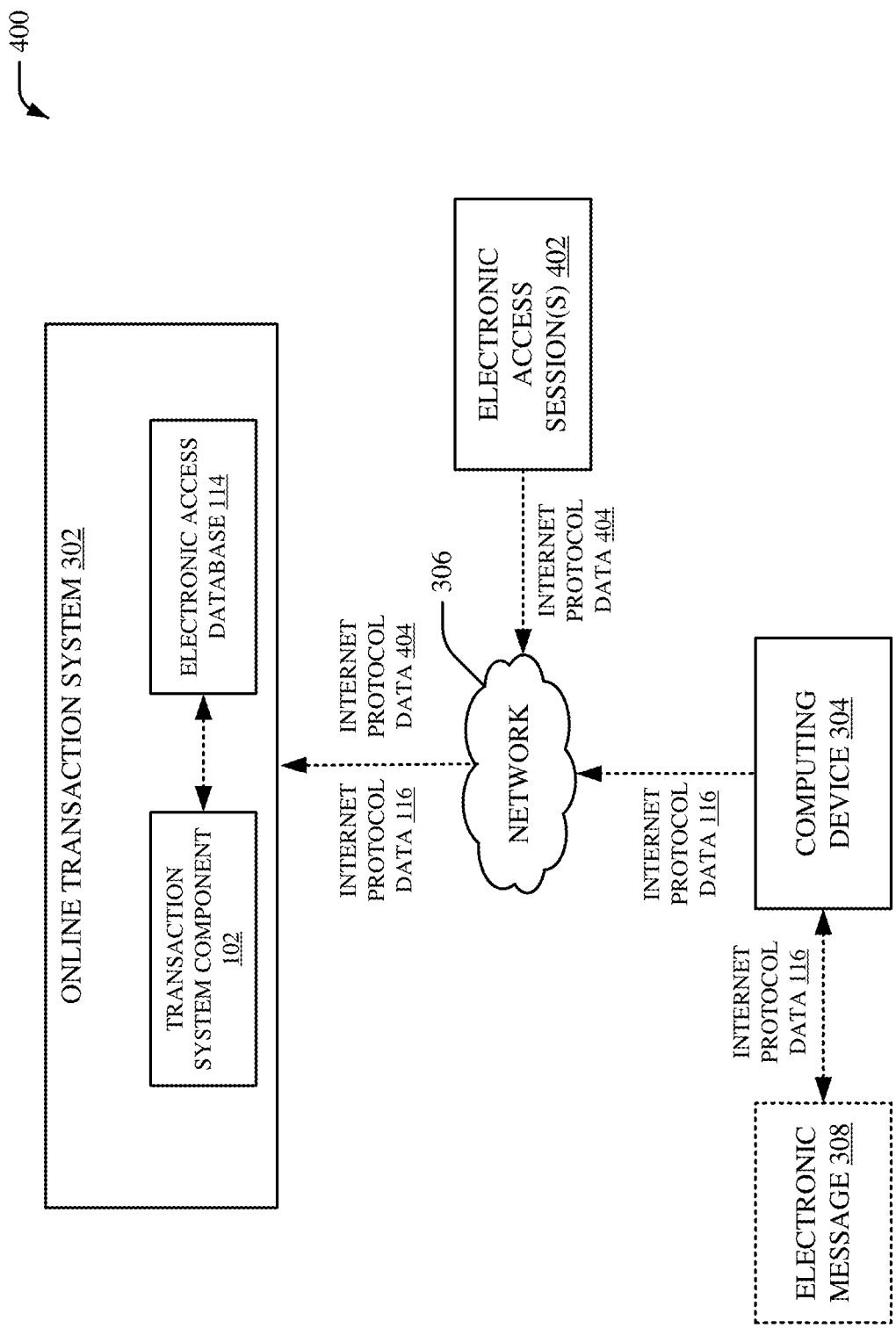
FIG. 4 illustrates another example, non-limiting system for providing security data points from an electronic message in accordance with one or more embodiments described herein.

FIG. 4 illustrates an example, non-limiting system 400 in accordance with one or more embodiments described herein. Repetitive description of like elements employed in other embodiments described herein is omitted for sake of brevity. The system 400 includes the online transaction system 302, the computing device 304 and one or more electronic access sessions 402. The online transaction system can include the transaction system component 102 and/or the electronic access database 114. Furthermore, the online transaction system 302, the computing device 304 and/or the one or more electronic access sessions 402 can be in communication via the network 306. In an embodiment, the online transaction system 302 that includes the transaction system component 102 can receive internet protocol data 404 via the network 306 in addition to the internet protocol data 116. In some embodiments of FIG. 4, the one or more electronic access sessions 402 and/or the internet protocol data 404 can be employed to facilitate determining whether a security threat (e.g., the cyber threat) exists with respect to the online transaction system 302.

The internet protocol data 404 can be, for example, data stored in the electronic access database 114. For instance, the internet protocol data 404 can include one or more IP addresses corresponding to one or more electronic accesses associated with the one or more electronic access sessions 402. In an aspect, the one or more electronic access sessions 402 can be related to the particular electronic account. In another aspect, the comparison component 106 of the transaction system component 102 can compare the internet protocol data 116 with the internet protocol data 404. For instance, the comparison component 106 of the transaction system component 102 can compare the internet protocol data 116 with one or more IP addresses included in the internet protocol data 404. In yet another aspect, the one or more electronic access sessions 402 associated with the internet protocol data 404 can include one or more electronic accesses related to a login attempt to the online transaction system 302, one or more previous transactions associated with the online transaction system 302, one or more web request sessions associated with the online transaction system 302, and/or another type of electronic access associated with the online transaction system 302.

Figure 5:
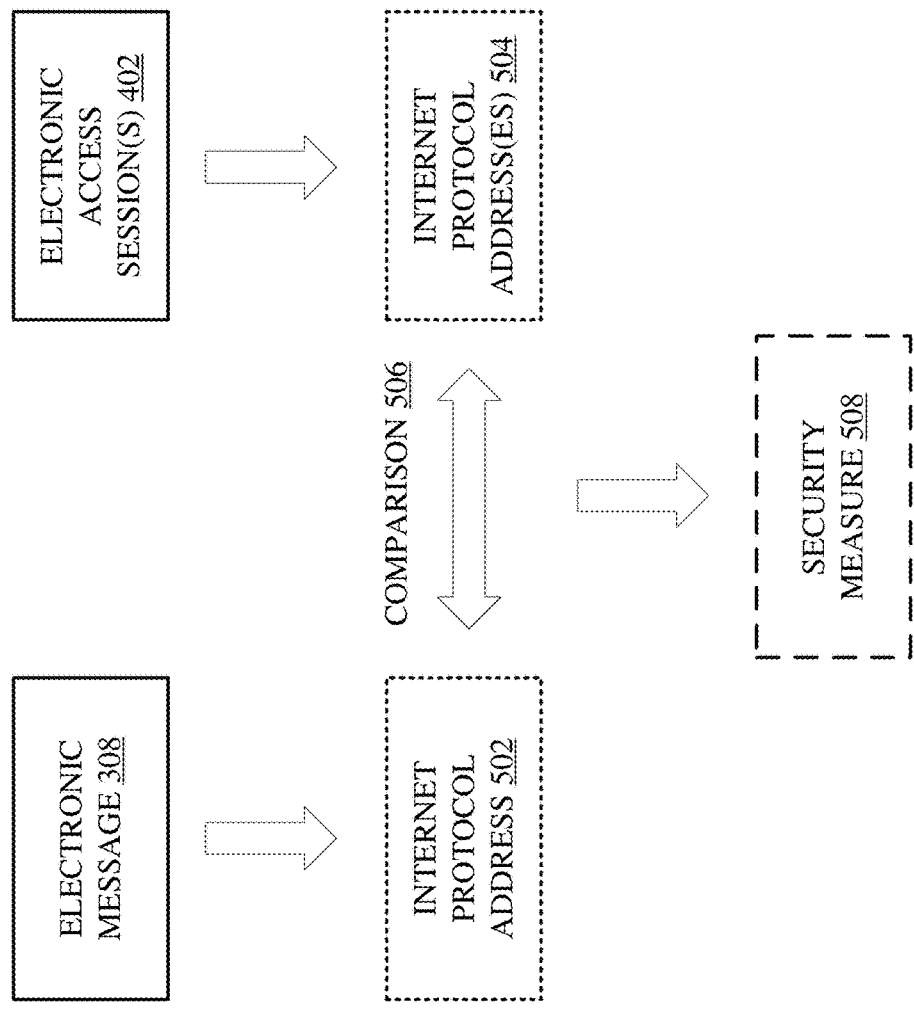
FIG. 5 illustrates yet another example, non-limiting system for providing security data points from an electronic message in accordance with one or more embodiments described herein.

FIG. 5 illustrates an example, non-limiting system 500 in accordance with one or more embodiments described herein. Repetitive description of like elements employed in other embodiments described herein is omitted for sake of brevity. The system 500 includes the electronic message 308 and the one or more electronic access sessions 402. The electronic message 308 can provide an internet protocol address 502.

The internet protocol address 502 can be, for example, an internet protocol address included in the internet protocol data 116. Furthermore, the one or more electronic access sessions 402 can provide one or more internet protocol addresses 504. The one or more internet protocol addresses 504 can be, for example, one or more internet protocol addresses included in the internet protocol data 404 and/or the electronic access database 114. In some embodiments of FIG. 5, the internet protocol address 502 and the one or more internet protocol addresses 504 can be employed to facilitate determining whether a security threat (e.g., the cyber threat) exists with respect to an online transaction system (e.g., the online transaction system 302).

In an embodiment, the comparison component 106 of the transaction system component 102 can perform a comparison 506 between the internet protocol address 502 and the one or more internet protocol addresses 504. For instance, the comparison component 106 of the transaction system component 102 can perform the comparison 506 between the internet protocol address 502 and the one or more internet protocol addresses 504 to determine whether the internet protocol address 502 is associated with a security threat (e.g., a cyber threat) and/or whether an account access anomaly exists with regard to the internet protocol address 502.

Furthermore, the security component 108 can perform a security measure 508 based on the comparison 506. For example, in response to a determination based on the comparison 506 that the internet protocol address 502 is associated with a security threat (e.g., a cyber threat), the security component 108 can implement the security measure 508 impacting an ability of a particular electronic account to conduct one or more transactions. As such, the comparison 506 can provide one or more security data points associated with the electronic message 308 to facilitate determining whether the internet protocol address 502 is associated with a security threat (e.g., a cyber threat). In an embodiment, the security measure 508 can be associated with a fraud mitigation process for an online transaction system (e.g., the online transaction system 302). For instance, the security measure 508 can include, for example, a fraud mitigation process associated with one or more transactions conducted by a particular electronic account. Furthermore, the security measure 508 can include, for example, setting one or more limits for one or more other electronic accounts, altering a risk level associated with the particular electronic account, altering a fraud risk model for one or more future transactions by one or more other electronic accounts, transmitting a step-up authentication request to a computing device associated with the internet protocol address 502, generating a digital security code to verify one or more transactions conducted by a particular electronic account, performing one or more tasks to mitigate an effect of the security threat (e.g., the cyber threat) on an online transaction system (e.g., the online transaction system 302), restricting access of a particular electronic account to an online transaction system (e.g., the online transaction system 302), performing one or more actions to modify one or more portions of an online transaction system (e.g., the online transaction system 302), performing score cutoff thresholds considering different criteria for an online transaction system (e.g., the online transaction system 302), and/or performing another type of security measure associated with an online transaction system (e.g., the online transaction system 302).

Figure 6:
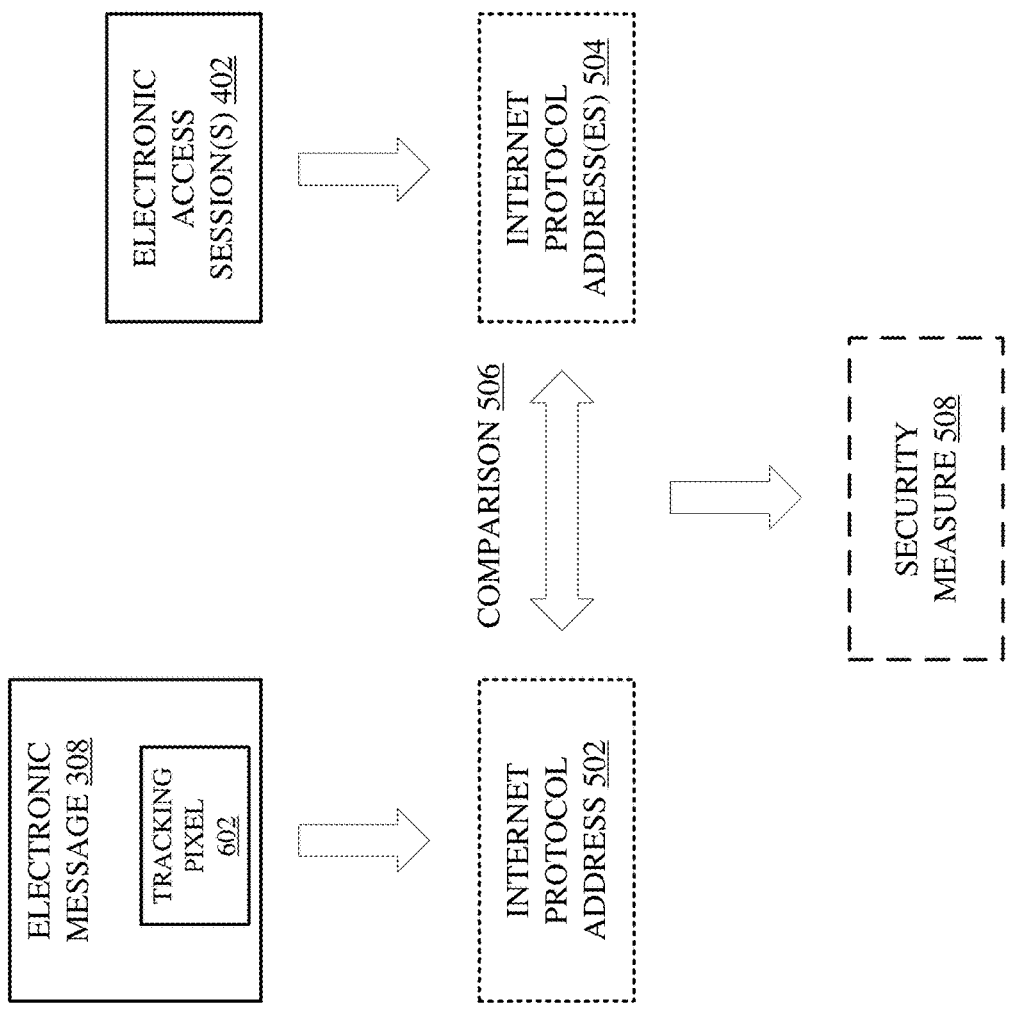
FIG. 6 illustrates yet another example, non-limiting system for providing security data points from an electronic message in accordance with one or more embodiments described herein.

FIG. 6 illustrates an example, non-limiting system 600 in accordance with one or more embodiments described herein. Repetitive description of like elements employed in other embodiments described herein is omitted for sake of brevity. The system 600 includes the electronic message 308 and the one or more electronic access sessions 402. Furthermore, the electronic message 308 can provide the internet protocol address 502 and the one or more electronic access sessions 402 can provide the one or more internet protocol addresses 504. In some embodiments of FIG. 6, a tracking pixel 602 included in the electronic message 308 can be employed to facilitate determining whether a security threat (e.g., the cyber threat) exists with respect to an online transaction system (e.g., the online transaction system 302).

In an embodiment, the comparison component 106 of the transaction system component 102 can perform the comparison 506 between the internet protocol address 502 and the one or more internet protocol addresses 504. Furthermore, in another embodiment, the security component 108 of the transaction system component 102 can implement the security measure 508 based on the comparison 506. In an embodiment, the internet protocol data 116 can be captured from the electronic message 308 via the tracking pixel 602. For example, the tracking pixel 602 can be included in the electronic message 308. In an aspect, the tracking pixel 602 can provide a callback transmission that includes the internet protocol address 502. In certain embodiments, the callback transmission associated with the tracking pixel 602 can additionally include a URL parameter that can associate the internet protocol data 116 with a corresponding electronic account of a user. In certain embodiments, the tracking pixel 602 can be media content (e.g., an image, a logo, etc.) included in the electronic message 308. Furthermore, the media content (e.g., the image, the logo, etc.) included in the electronic message 308 can provide a callback transmission that includes the internet protocol address 502. In certain embodiments, the callback transmission associated with the media content (e.g., the image, the logo, etc.) included in the electronic message 308 can additionally include a URL parameter that can associate the internet protocol data 116 with a corresponding electronic account of a user.

Figure 7:
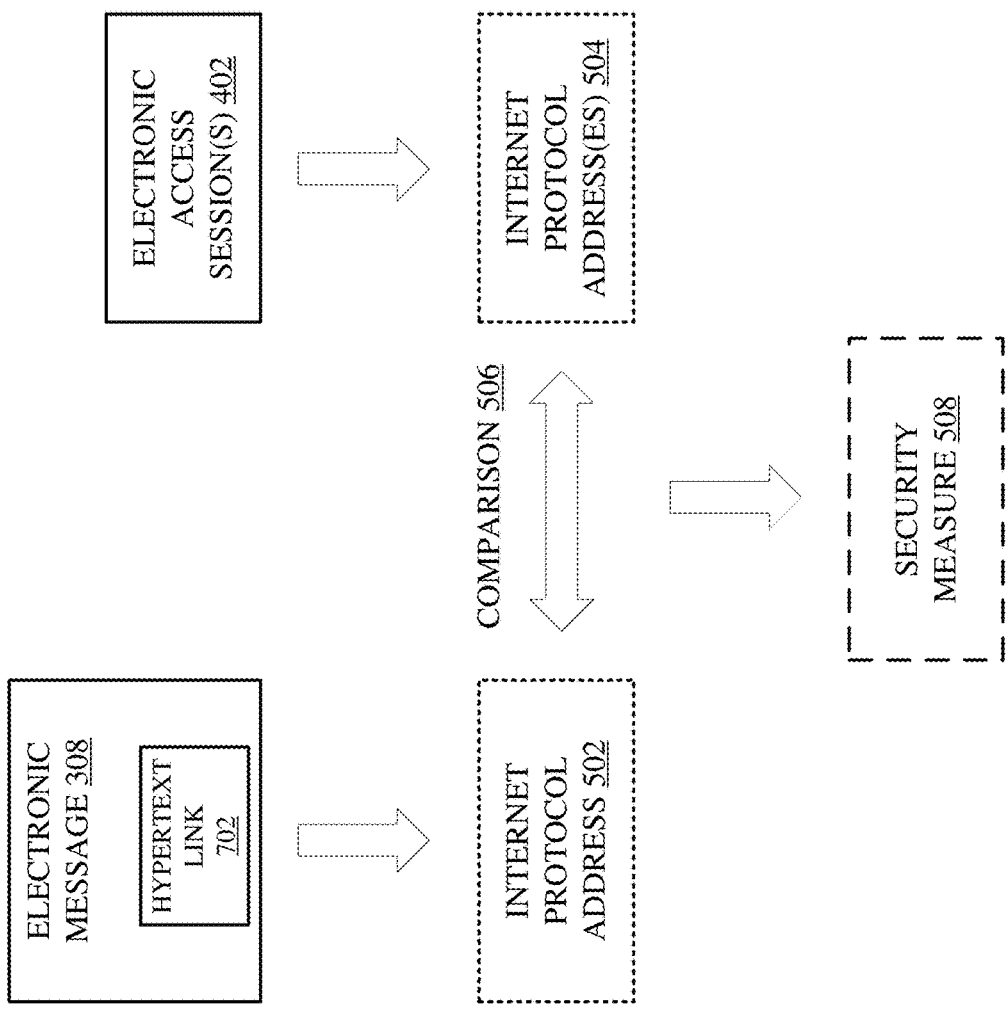
FIG. 7 illustrates yet another example, non-limiting system for providing security data points from an electronic message in accordance with one or more embodiments described herein.

FIG. 7 illustrates an example, non-limiting system 700 in accordance with one or more embodiments described herein. Repetitive description of like elements employed in other embodiments described herein is omitted for sake of brevity. The system 700 includes the electronic message 308 and the one or more electronic access sessions 402. Furthermore, the electronic message 308 can provide the internet protocol address 502 and the one or more electronic access sessions 402 can provide the one or more internet protocol addresses 504. In some embodiments of FIG. 7, a hypertext link 702 included in the electronic message 308 can be employed to facilitate determining whether a security threat (e.g., the cyber threat) exists with respect to an online transaction system (e.g., the online transaction system 302). For example, the hypertext link 702 included in the electronic message 308 can be employed to raise one or more flags associated with a potential security threat (e.g., a potential cyber threat) and/or to facilitate initiation of a mitigative action in response to a potential security threat (e.g., a potential cyber threat).

In an embodiment, the comparison component 106 of the transaction system component 102 can perform the comparison 506 between the internet protocol address 502 and the one or more internet protocol addresses 504. Furthermore, in another embodiment, the security component 108 of the transaction system component 102 can implement the security measure 508 based on the comparison 506. In an embodiment, the internet protocol data 116 can be captured from the electronic message 308 via the hypertext link 702.

For example, the hypertext link 702 can be included in the electronic message 308. In an aspect, the hypertext link 702 can provide a callback transmission that includes the internet protocol address 502. For instance, the internet protocol address 502 can be obtained in response to accessing the hypertext link 702 via the electronic message 308. In an example, the hypertext link 702 can provide the callback transmission in response to being clicked (e.g., accessed, visited, etc.) via the electronic message 308. In certain embodiments, the callback transmission associated with the hypertext link 702 can additionally include a URL parameter that can associate the internet protocol data 116 with a corresponding electronic account of a user.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 8:
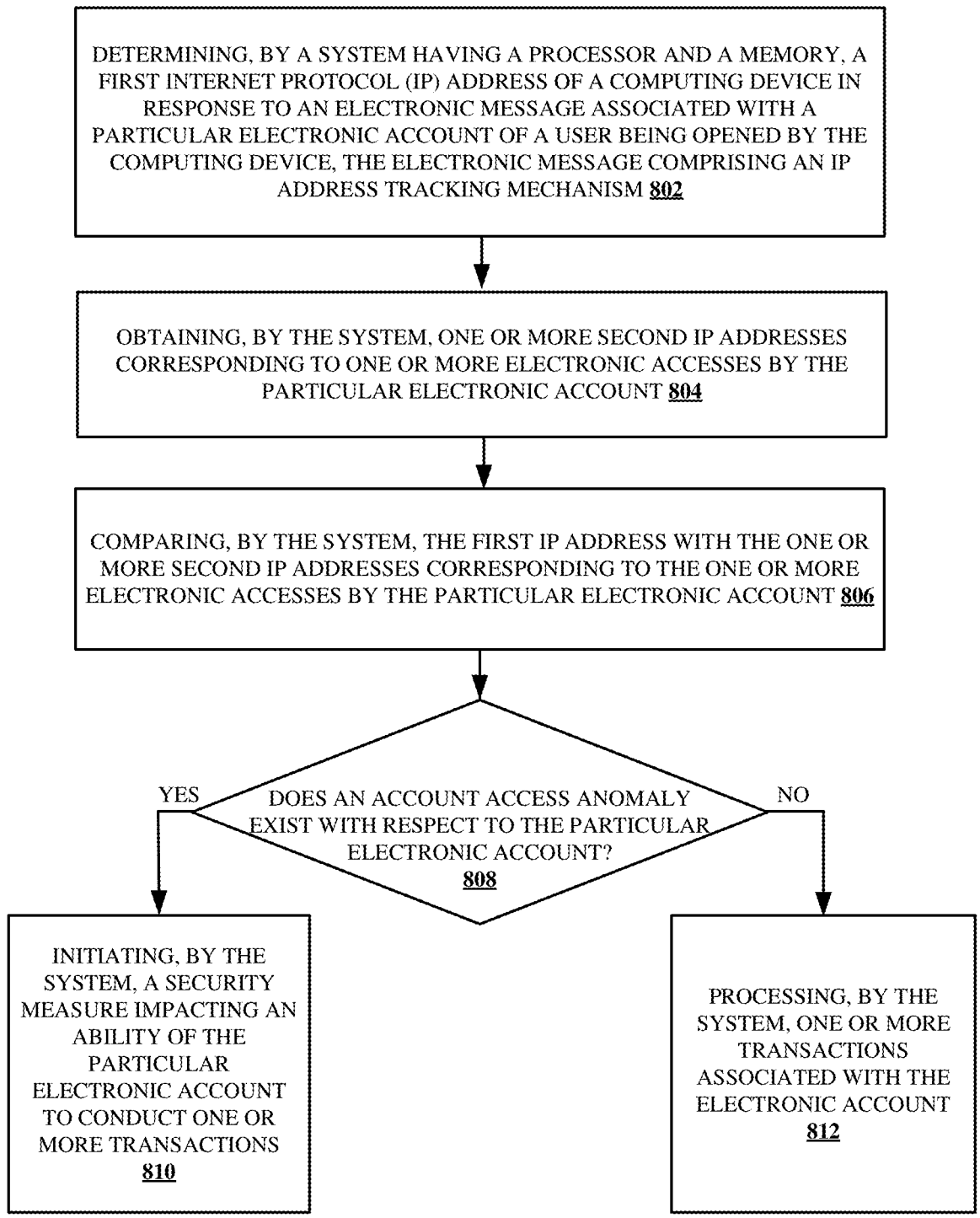
FIG. 8 illustrates a flow diagram of an example, non-limiting method related to determining whether an account access anomaly exists using information from an electronic message in accordance with one or more embodiments described herein.

FIG. 8 illustrates a methodology and/or a flow diagram in accordance with the disclosed subject matter. For simplicity of explanation, the methodology is depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodology in accordance with the disclosed subject matter. In addition, those skilled in the art will understand and appreciate that the methodology could alternatively be represented as a series of interrelated states via a state diagram or events. Additionally, it should be further appreciated that the methodology disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Referring to FIG. 8, there illustrated is a methodology 800 related to determining whether an account access anomaly exists using information from an electronic message, which may indicate whether a transaction should be processed or if a security measure should be taken, according to one or more embodiments. Repetitive description of like elements employed in other embodiments described herein is omitted for sake of brevity. Some or all elements of FIG. 8 may be performed by transaction system component 102, according to various embodiments.

At 802, a first internet protocol (IP) address of a computing device is determined, by a system having a processor and a memory (e.g., by the data intelligence component 104), in response to an electronic message associated with a particular electronic account of a user being opened by the computing device. Furthermore, the electronic message can comprise an IP address tracking mechanism. The electronic message can be, for example, an email. In an embodiment, the first IP address can be determined in response to an email associated with the particular electronic account being opened by the computing device. The IP address tracking mechanism can include, for example, a tracking pixel included in the electronic message. In another example, the IP address tracking mechanism can include a hypertext link included in the electronic message. For instance, the first IP address can be obtained in response to accessing the hypertext link via the electronic message.

At 804, one or more second IP addresses corresponding to one or more electronic accesses by the particular electronic account are obtained, by the system (e.g., by the data intelligence component 104). For example, the one or more second IP addresses can be associated with one or more electronic accesses of the particular electronic account, especially accesses that may have occurred separate from the electronic message in operation 802 (e.g. a user accessing her account in a way that does not depend on viewing the electronic message). An electronic access from the one or more electronic accesses can include, for example, a login attempt to an online transaction system by the particular electronic account, one or more previous transactions associated with the particular electronic account, one or more web request sessions associated with the particular electronic account, and/or another type of electronic access associated with the particular electronic account. Note that operations 802 and 804 may occur in any order, in various embodiments (as may other operations described herein).

At 806, the first IP address is compared, by the system (e.g., by the comparison component 106), with the one or more second IP addresses corresponding to the one or more electronic accesses by the particular electronic account. For example, it can be determined if the first IP address matches at least one IP address from the one or more second IP addresses.

At 808, it is determined whether an account access anomaly exists with respect to the particular electronic account. For example, it can be determined based on the comparison between the first IP address and the one or more IP addresses whether an account access anomaly exists with respect to the particular electronic account. Additionally, in certain embodiments, time data associated with an access time of the electronic message by the computing device can be employed to whether an account access anomaly exists with respect to the particular electronic account. If yes, the methodology 800 proceeds to 810. If no, the methodology 800 proceeds to 812.

At 810, a security measure impacting an ability of the particular electronic account to conduct one or more transactions is initiated, by the system (e.g., by the security component 108). The security measure can be associated with a fraud mitigation process for an online transaction system associated with the one or more transactions. For instance, the security measure can include, for example, a fraud mitigation process associated with one or more transactions conducted by the particular electronic account. Furthermore, the security measure can include, for example, setting one or more limits for the particular electronic account and/or one or more other electronic accounts, altering a risk level associated with the particular electronic account and/or the particular electronic account, altering a fraud risk model for one or more future transactions by the particular electronic account and/or one or more other electronic accounts, transmitting a step-up authentication request to the computing device, generating a digital security code to verify one or more transactions conducted by the particular electronic account, performing one or more tasks to mitigate an effect of the security threat (e.g., the cyber threat) on an online transaction system associated with the one or more transactions, restricting access of the particular electronic account to an online transaction system associated with the one or more transactions, performing one or more actions to modify one or more portions of an online transaction system associated with the one or more transactions, performing score cutoff thresholds considering different criteria for an online transaction system associated with one or more transactions, and/or performing another type of security measure associated with an online transaction system associated with one or more transactions.

At 812, one or more transactions associated with the electronic account is processed, by the system (e.g., by the transaction system component 102 and/or the online transaction system 302). For instance, one or more transactions requested by the electronic account can be fulfilled by an online transaction system. In an example, a financial transaction (e.g., a payment) requested by the electronic account can be fulfilled by an online transaction system. In another example, funds associated with the one or more transactions can be transferred from the electronic account and to another electronic account (and/or to another entity).

Figure 9:
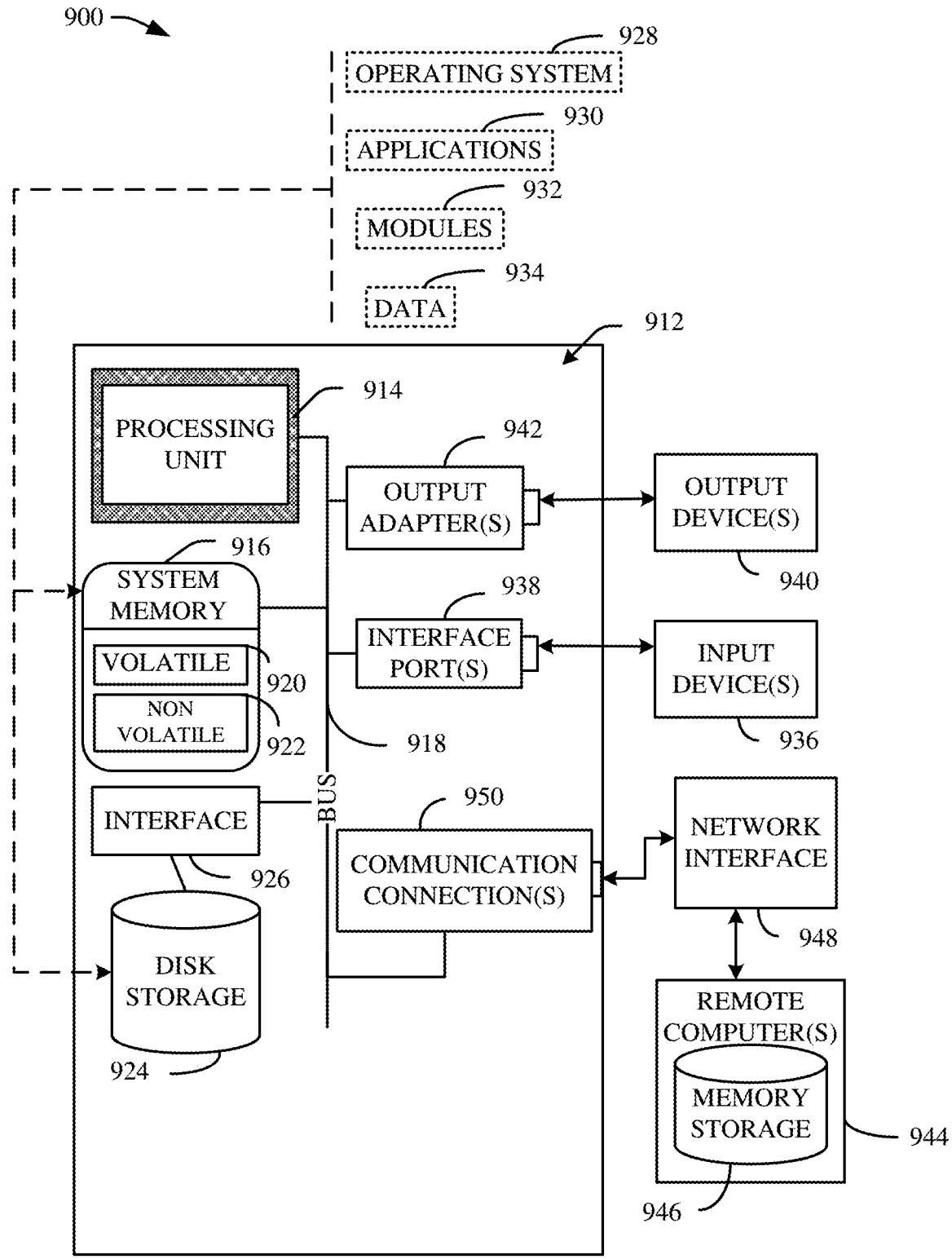
FIG. 9 is a schematic block diagram illustrating a suitable operating environment.
Figure 10:
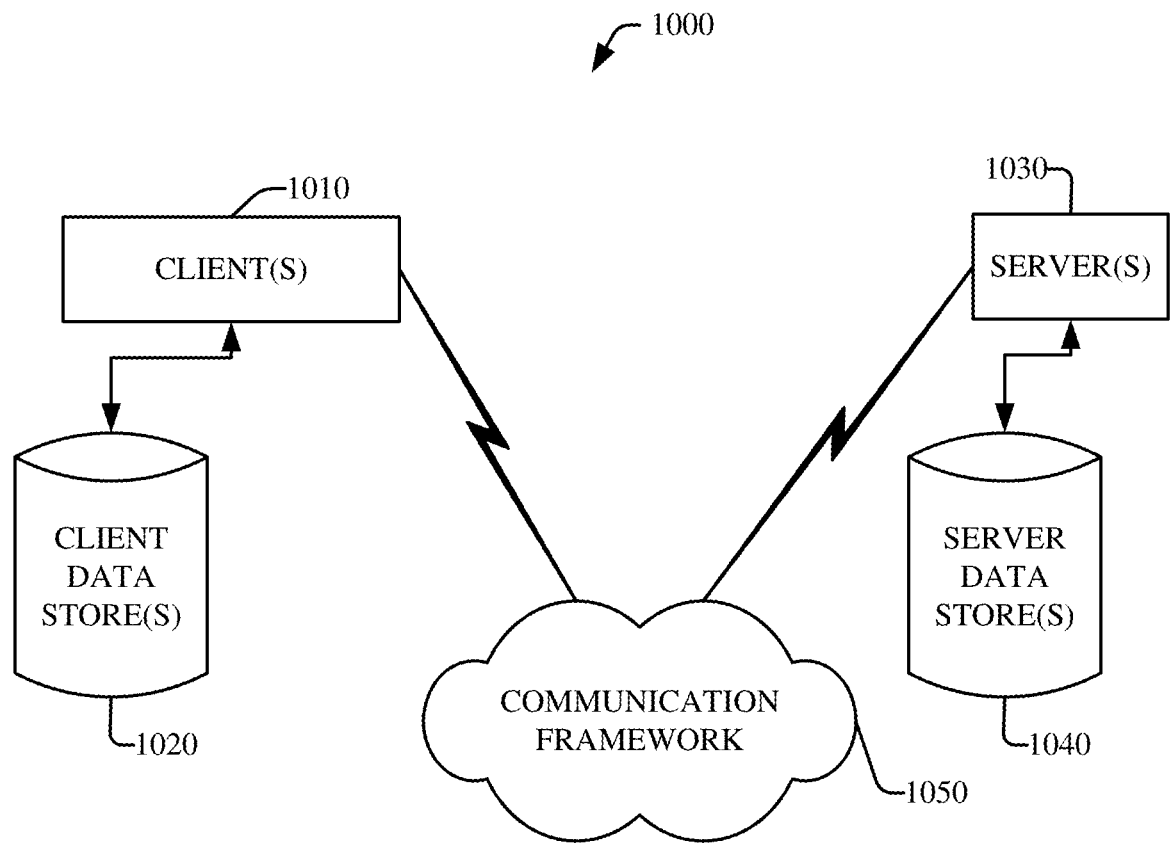
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented.

With reference to FIG. 9, a suitable environment 900 for implementing various aspects of this disclosure includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 also includes removable/non-removable, volatile/non-volatile computer storage media. FIG. 9 illustrates, for example, a disk storage 924. Disk storage 924 includes, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computer system 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 with which the subject matter of this disclosure can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a non-transitory computer readable medium having stored thereon instructions executable to cause the system to perform operations comprising:
receiving a request to conduct one or more transactions corresponding to an electronic account of a user;
using an IP address tracking mechanism, determining a first internet protocol (IP) address of a computing device based on the user of the computing device accessing an email sent to an email address that is registered to the electronic account of the user,
wherein the email includes the IP address tracking mechanism;
determining if a security threat is present for the one or more transactions, comprising comparing the first IP address with one or more second IP addresses corresponding to one or more electronic accesses of the electronic account; and
based on the comparing indicating that the first IP address does not match at least one of the one or more second IP addresses, implementing a security measure impacting an ability of the electronic account to conduct the one or more transactions,
wherein implementing the security measure comprises approving at least one transaction of the one or more transactions based on determining that the at least one transaction is an electronic monetary transaction under a threshold amount;
wherein determining if the security threat is present is further based on an initial time at which the email was accessed.

2. The system of claim 1, wherein determining if the security threat is present comprises analyzing at least one of web browser data associated with the computing device, user agent data associated with the computing device, operating system data associated with the computing device, or device data associated with the computing device.

3. The system of claim 1, wherein the one or more transactions comprise an electronic monetary transaction.

4. The system of claim 1, wherein the IP address tracking mechanism comprises a tracking pixel included in the email.

5. The system of claim 1, wherein implementing the security measure comprises transmitting a step-up authentication request to the user.

6. The system of claim 1, wherein implementing the security measure comprises denying the at least one of the one or more transactions.

7. A method, comprising:
  receiving, at a computer system, a request to conduct one or more transactions corresponding to an electronic account of a user;
  using an IP address tracking mechanism, determining a first internet protocol (IP) address of a computing device based on the user of the computing device accessing an email sent to an email address that is registered to the electronic account of the user,
    wherein the email includes the IP address tracking mechanism;
  determining if a security threat is present for the one or more transactions, comprising comparing the first IP address with one or more second IP addresses corresponding to one or more electronic accesses of the electronic account; and
  based on the comparing indicating that the first IP address does not match at least one of the one or more second IP addresses, the computer system implementing a security measure impacting an ability of the electronic account to conduct the one or more transactions,
    wherein implementing the security measure comprises approving at least one transaction of the one or more transactions based on determining that the at least one transaction is an electronic monetary transaction under a threshold amount;
    wherein determining if the security threat is present is further based on an initial time at which the email was accessed.

8. The method of claim 7, wherein determining if the security threat is present comprises analyzing at least one of web browser data associated with the computing device, user agent data associated with the computing device, operating system data associated with the computing device, or device data associated with the computing device.

9. The method of claim 7, wherein the one or more transactions comprise an electronic monetary transaction.

10. The method of claim 7, wherein the IP address tracking mechanism comprises a tracking pixel included in the email.

11. The method of claim 7, wherein implementing the security measure comprises transmitting a step-up authentication request to the user.

12. The method of claim 7, wherein implementing the security measure comprises denying the least one of the one or more transactions.

13. A non-transitory computer-readable medium having stored thereon instructions executable by a computer system to cause the computer system to perform operations comprising:
  receiving a request to conduct one or more transactions corresponding to an electronic account of a user;
  using an IP address tracking mechanism, determining a first internet protocol (IP) address of a computing device based on the user of the computing device accessing an email sent to an email address that is registered to the electronic account of the user,
    wherein the email includes the IP address tracking mechanism;
  determining if a security threat is present for the one or more transactions, comprising comparing the first IP address with one or more second IP addresses corresponding to one or more electronic accesses of the electronic account; and
  based on the comparing indicating that the first IP address does not match at least one of the one or more second IP addresses, implementing a security measure impacting an ability of the electronic account to conduct the one or more transactions,
    wherein implementing the security measure comprises approving at least one transaction of the one or more transactions based on determining that the at least one transaction is an electronic monetary transaction under a threshold amount;
    wherein determining if the security threat is present is further based on an initial time at which the email was accessed.

14. The non-transitory computer-readable medium of claim 13, wherein determining if the security threat is present comprises analyzing at least one of web browser data associated with the computing device, user agent data associated with the computing device, operating system data associated with the computing device, or device data associated with the computing device.

15. The non-transitory computer-readable medium of claim 13, wherein the one or more transactions comprise an electronic monetary transaction.

16. The non-transitory computer-readable medium of claim 13, wherein the IP address tracking mechanism comprises a tracking pixel included in the email.

17. The non-transitory computer-readable medium of claim 13, wherein implementing the security measure comprises transmitting a step-up authentication request to the user.

18. The non-transitory computer-readable medium of claim 13, wherein implementing the security measure comprises denying the at least one of the one or more transactions.

* * * * *